United States Patent [19]

Edatsune et al.

[11] Patent Number: 6,040,918
[45] Date of Patent: *Mar. 21, 2000

[54] COPYING MACHINE

[75] Inventors: Isao Edatsune; Hiroshi Kuriyama; Osamu Urano, all of Nagano-ken, Japan

[73] Assignee: Sieko Epson Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/926,385

[22] Filed: Sep. 9, 1997

Related U.S. Application Data

[63] Continuation of application No. 08/491,833, filed as application No. PCT/JP94/01660, Apr. 10, 1994, Pat. No. 5,699,166.

[30] Foreign Application Priority Data

Nov. 9, 1993 [JP] Japan .................... 5-279859
Nov. 18, 1993 [JP] Japan .................... 5-289549

[51] Int. Cl.$^7$ .................................................. G03G 15/05
[52] U.S. Cl. ......................... 358/296; 358/296; 399/133
[58] Field of Search ................... 358/296, 298, 358/443, 448, 456, 458, 459; 382/254, 258, 276, 294, 296; 399/133

[56] References Cited

U.S. PATENT DOCUMENTS

| | | | |
|---|---|---|---|
| 3,597,076 | 8/1971 | Hubbard et al. | 355/65 |
| 4,674,771 | 6/1987 | Thompson, II | 282/8 R |
| 4,763,889 | 8/1988 | Dei et al. | 399/367 |
| 4,833,122 | 5/1989 | Doll et al. | 428/40 |
| 5,049,228 | 9/1991 | Sato | 400/208 |
| 5,089,897 | 2/1992 | Curley | 358/296 |
| 5,122,004 | 6/1992 | Yamada et al. | 400/616 |
| 5,188,469 | 2/1993 | Nagao et al. | 400/120 |
| 5,189,470 | 2/1993 | Matsuda et al. | 355/208 |
| 5,191,428 | 3/1993 | Sakai et al. | 358/296 |
| 5,219,234 | 6/1993 | Sakai | 400/120 |

(List continued on next page.)

FOREIGN PATENT DOCUMENTS

| | | |
|---|---|---|
| 336254 | 4/1991 | Japan . |
| 5-53383 | 7/1993 | Japan . |
| 6-32942 | 5/1994 | Japan . |
| 2163764 | 6/1997 | Japan . |

OTHER PUBLICATIONS

English Language Summary of Japanese Patent HEI 6–32942, issued May 2, 1994.
English Language Summary of Japanese Patent Application HEI 5–53383, laid–open Jul. 13, 1993.

*Primary Examiner*—Peter S. Wong
*Assistant Examiner*—Gregory J. Toatley, Jr.
*Attorney, Agent, or Firm*—Loeb & Loeb, LLP

[57] ABSTRACT

A copying machine of the present invention has a scanner unit (2) for reading an original, a line type thermal head (14) for printing read image data on tape (16) to be used as a recording medium, a tape cartridge (51) for supplying the tape and a tape conveying mechanism. The tape (16) has an image carrying sheet (161), the front surface of which is a printing face to be printed with an image, an adhesive layer (162) formed by applying an adhesive to the back surface of this image carrying sheet and a release sheet (163) releasably stuck to the surface of the adhesive layer. The tape is taken up like a roll and is detachably fitted into the body of the copying machine in the form of the tape cartridge (51). At both ends of the tape, conveyance border portions of a uniform width are formed. In the border portions, engaging holes ( ) are formed at regular intervals in the direction of the length of the tape. The tape conveying mechanism has sprockets (183, 184), on the outer circumferences of which projections being capable of engaging with the engaging holes are formed. The tape can be conveyed with high precision and a desired image can be printed thereon. Thereby, the copying machine of the present invention can easily obtain a tape, which has a desired image copied and is able to be stuck to a desired place.

10 Claims, 15 Drawing Sheets

U.S. PATENT DOCUMENTS

| | | | |
|---|---|---|---|
| 5,284,689 | 2/1994 | Larash et al. | 428/40 |
| 5,354,723 | 10/1994 | Gundjian | 428/207 |
| 5,440,106 | 8/1995 | Duck | 235/3 |
| 5,452,057 | 9/1995 | Imaizumi et al. | 355/208 |
| 5,537,135 | 7/1996 | Hevenor et al. | 347/171 |
| 5,642,147 | 6/1997 | Yamashita et al. | 347/171 |
| 5,699,166 | 12/1997 | Edatsune et al. | 358/296 |

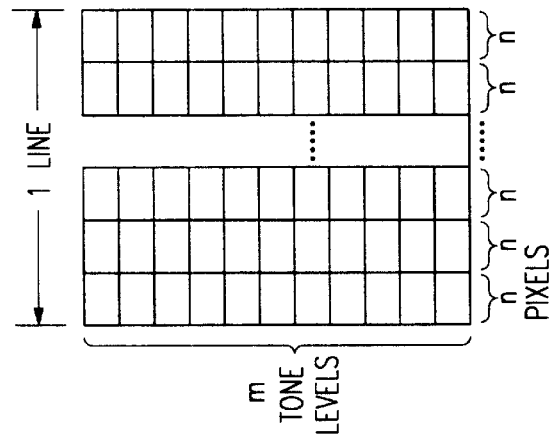
FIG. 3(d)
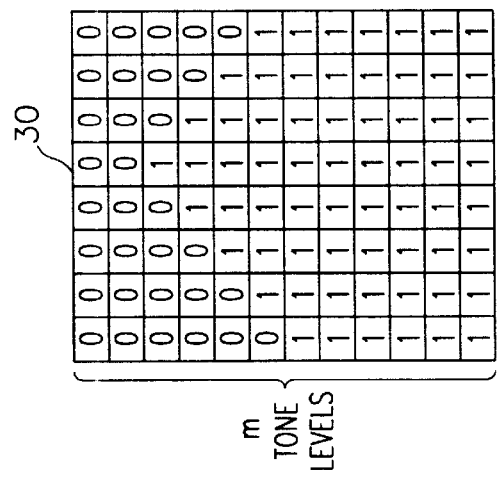
FIG. 3(c)
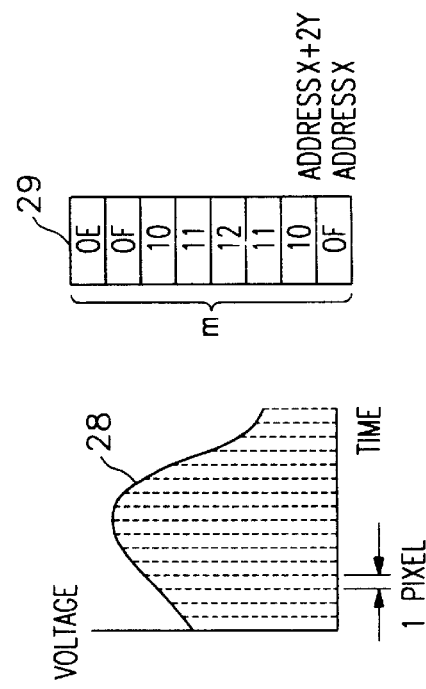
FIG. 3(b)
FIG. 3(a)

COPYING MACHINE

This is a continuation application of Ser. No. 08/491,833, filed Oct. 10, 1995, now U.S. Pat. No. 5,699,166, which is a §371 application of PCT/JP94/01660, filed Apr. 10, 1994.

FIELD OF THE INVENTION

The present invention relates to a copying machine configured to read a monochrome or multicolor original image and copy the read image onto a recording medium, on the back of which an adhesive face is formed.

BACKGROUND

A conventional copying machine is configured to reproduce read image data on to a recording medium such as a sheet of plain-paper, a transparency for use with an overhead projector (OHP) or the like. Generally, a copying machine consists of an image reading portion for reading an original image, an image forming portion for reproducing the read image onto a recording medium, and a recording medium supplying portion for supplying and conveying the recording medium. The image reading portion reads each pixel line of the original image line by line. For the image forming portion, a line type thermal head for printing the read image line by line is typically used. The recording medium is typically a sheet of plain paper of a fixed size. Rarely is the recording medium larger than a single sheet of paper.

Recently, it has become widespread to print characters or figures on a label with an adhesive surface by using a word processor. In view of this, an object of the preferred embodiments of the present invention is to provide a copying machine which can copy a color image or the like onto a label. Further, another object of the preferred embodiments of the invention is to provide a copying machine which reads a photographic negative film and reproduces a positive image on a label.

Moreover, a further object of the preferred embodiments is to provide a copying machine which reproduces a color image on a label of arbitrary length by printing the images in such colors as yellow (Y), magenta (M) and cyan (C) or mixtures thereof, on a tape-like label. Still another objective is to provide a copying machine which reproduces a plurality of the same image on a tape-like label.

SUMMARY OF THE INVENTION

To achieve the foregoing objects, a copying machine according to a preferred embodiment comprises image reading means for reading an original image, image printing means for printing read image data onto a recording medium, and recording medium supplying means for supplying the recording medium to the image printing means. The recording medium further has an image carrying sheet, the front surface of which is a printing face to be printed with an image and the back surface of which has an adhesive layer formed by applying an adhesive, and a release sheet releasably affixed to a surface of the adhesive layer. It is preferable that the image reading means is a color image reading means capable of reading a color image, and that the image printing means is a color image printing means capable of reproducing a color image. The adhesive layer may be exposed by peeling the release sheet from the back surface of the image carrying sheet. Consequently, a recording medium onto which a given image is copied can be affixed to any suitable surface.

In addition, the copying machine may be equipped with an image data converting means for converting negative image data read from a photographic negative film into positive image data. In this manner, an image represented by the photographic negative film is reproduced into a positive image on the recording medium.

A tape-like recording medium of a uniform width (referred to as "tape" in the present specification) can be employed as the recording medium in the preferred embodiment. In such a case, the recording medium supplying means may be provided with a tape roll onto which the tape is rolled, and a tape conveying mechanism for feeding the tape from the tape roll to the image printing means. The tape roll may be enclosed in a cartridge and, preferably, provided in the form of a tape cartridge to facilitate replacement. Further, if tape cartridges of different widths and colors are available, a suitable tape of the users choice can be easily obtained therefrom.

When the tape is employed as the recording medium, it is preferable to accurately convey the tape and to precisely position a portion of the tape at a predetermined position. In the preferred embodiments, conveyance border portions of a uniform width are formed along the both edges of the tape. The tape conveying mechanism is configured to securely catch or hold the conveyance border portions. For example, a tape conveying means comprising a pair of sprockets for engaging holes formed in the border portions of the tape can more accurately advance the tape than an ordinary friction conveying mechanism.

If the conveyance border portions are respectively formed along both edges of the tape, it is preferable to form along the inner edge of the border portions a perforated part extending in the longitudinal direction of the image carrying sheet of the tape. In this fashion, only the image carrying sheet can be easily peeled off from the tape after being copied.

It is also desirable in a preferred embodiment of the portable copying machine to use small and compact devices as the image reading means and the image printing means. For this purpose, a line scanner which reads each pixel line of an original image may be employed as the image reading means, and a line type thermal printer may be employed as the image printing means.

When using tape as the recording medium and employing the tape conveying mechanism consisting of sprockets as discussed above, the space between the sprockets is fixed. This restricts the width of the image printing area of the tape to a fixed size. As a result, if an image having a width smaller than the width of the tape is copied, unused portions are generated on both sides of the tape. Therefore, it is preferable to employ the following configuration when copying a large number of small originals so that a plurality of copies of the same image can be made onto the tape in the direction of the tape width. Namely, a line type thermal printer may be constructed which comprises a line type thermal head, a shift register for storing the image data of each pixel line to be reproduced by the thermal head, a head driver for operating the line type thermal head to emit heat, and a printer controller for controlling the shift register. The shift register has N registers (where N is an integer equal to or greater than 2) along the flow direction of the image data and is coupled to a driving clock signal. Further, several of such N shift registers are coupled to each other along the flow direction of the image data and to a driving clock signal in such a way that the connection between the N shift registers can be selectively switched between a series connection and a parallel connection. In the case of duplicating a plurality of copies in the direction of the tape width, the coupled N shift registers may be connected in parallel with one another so that the same image data are supplied thereto simultaneously.

When making multiple copies of the same image in the direction of the tape width, it is preferable to form (N−1) perforations between a pair of the perforated parts formed in both edges of the tape so that each copy can be easily separated and peeled from the sheet.

BRIEF DESCRIPTION OF DRAWINGS

FIGS. 3(a) to 3(d) are diagrams illustrating the procedure of processing image data read by the copying machine of FIG. 1;

DETAILED DESCRIPTION OF THE PREFERRED EMBODIMENTS

Hereinafter, embodiments of the present invention will be described by referring to the accompanying drawings.

Figure 1:
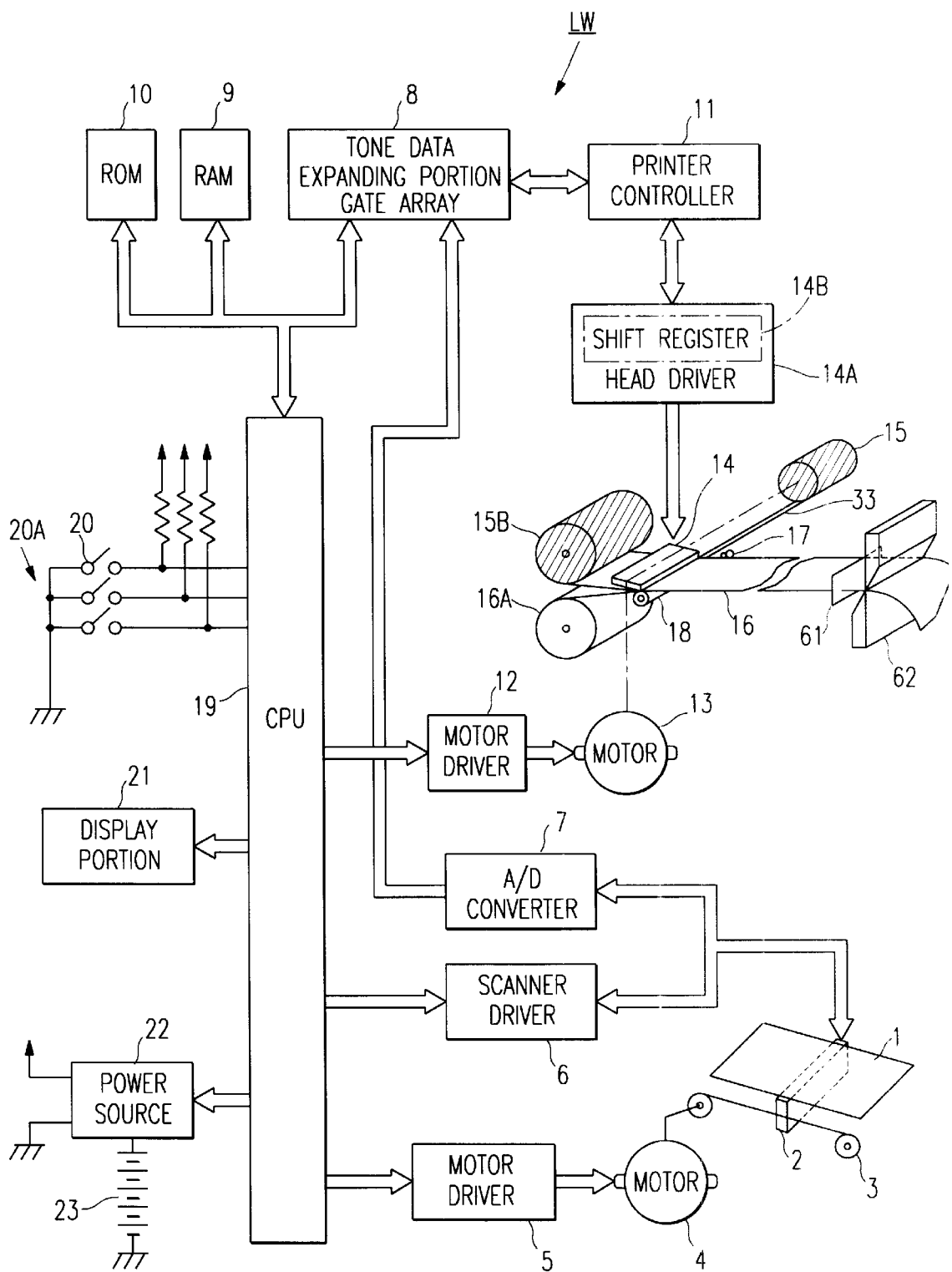
FIG. 1 is a schematic block diagram for illustrating the entire configuration of a copying machine according to an embodiment of the present invention.

FIG. 1 illustrates the configuration of a color copying machine according to an embodiment of the present invention. The color copying machine LW has a draft glass plate 1 and a scanner unit 2 for reading an original. The image reading means is primarily composed of a scanner unit 2. The scanner unit 2 scans the original in a back and forth fashion by a carriage mechanism comprising a pulley 3 and a belt 3a which are driven by means of a motor 4. The scanner unit 2 comprises a scanner driver 6 for driving a light source and a sensor. Image data read by the scanner unit 2 is converted by an A/D converter 7 into digital data. The image printing means is mainly composed of a line type thermal head 14 which is controlled by a printer controller 11.

A tape 16, which is used as a recording medium, is composed of an image carrying sheet, the front surface of which is a printing face to be printed with an image and the back surface of which has an adhesive layer formed by applying an adhesive, and a release sheet releasably affixed to a surface of the adhesive layer. In a preferred embodiment, the tape 16 is in the form of a roll in a tape cartridge. The tape 16 unwinds from the tape cartridge and is conveyed by a tape conveying mechanism so as to pass between the line type thermal head 14 and a platen roller 18 facing the head 14 (hereinafter referred to as "the printing position"). The tape is then ejected from the body of the copying machine. The recording medium supplying means is mainly composed of the tape cartridge and the tape conveying mechanism, which are described in further detail below.

After the front surface of the tape is printed, the tape is ejected from a tape exhaust port 61 formed on a side of the copying machine LW. A manual tape cutting mechanism 62 is provided at the tape exhaust port 61 to cut the tape to a predetermined length.

Reference numeral 15 designates an ink ribbon roller, from which an ink ribbon 33 is unwound and conveyed to the ribbon take-up roll 15B by way of the printing position. At the printing position, an ink surface of the ink ribbon 33 is placed against the printing face of the tape 16. Then, the thermal head 14 prints an image on the printing surface of the tape by emitting heat from the back surface of the tape. The ink ribbon may be made of a sublimation type ribbon or other suitable material.

Next, reference numeral 19 denotes a CPU constituted by a microcomputer, which controls the entire copying machine pursuant to a control program preferably stored in a ROM 10. Namely, the CPU 19 drives the scanner unit 2 in response to power source switches 20 arranged on a console portion 20A and performs a reading operation by reading an original image on the draft glass plate 1. Further, the CPU 19 drives the motor 13 through a motor driver 12, to control the tape 16 and the ink ribbon 33 in synchronization with the reading operation. After the read image data are converted by the A/D converter 7 into digital data, the converted data are transferred to a tone data expanding portion 8, whereupon the digital data are expanded in the form of printing data to be printed by the thermal head. The RAM 9 is a temporary memory in which the expanded printing data are temporarily stored. The color copying machine LW further comprises a power source circuit 22, a battery power source 23, and a display portion 21 for displaying the operating conditions or other operating information of the copying machine.

Figure 2:
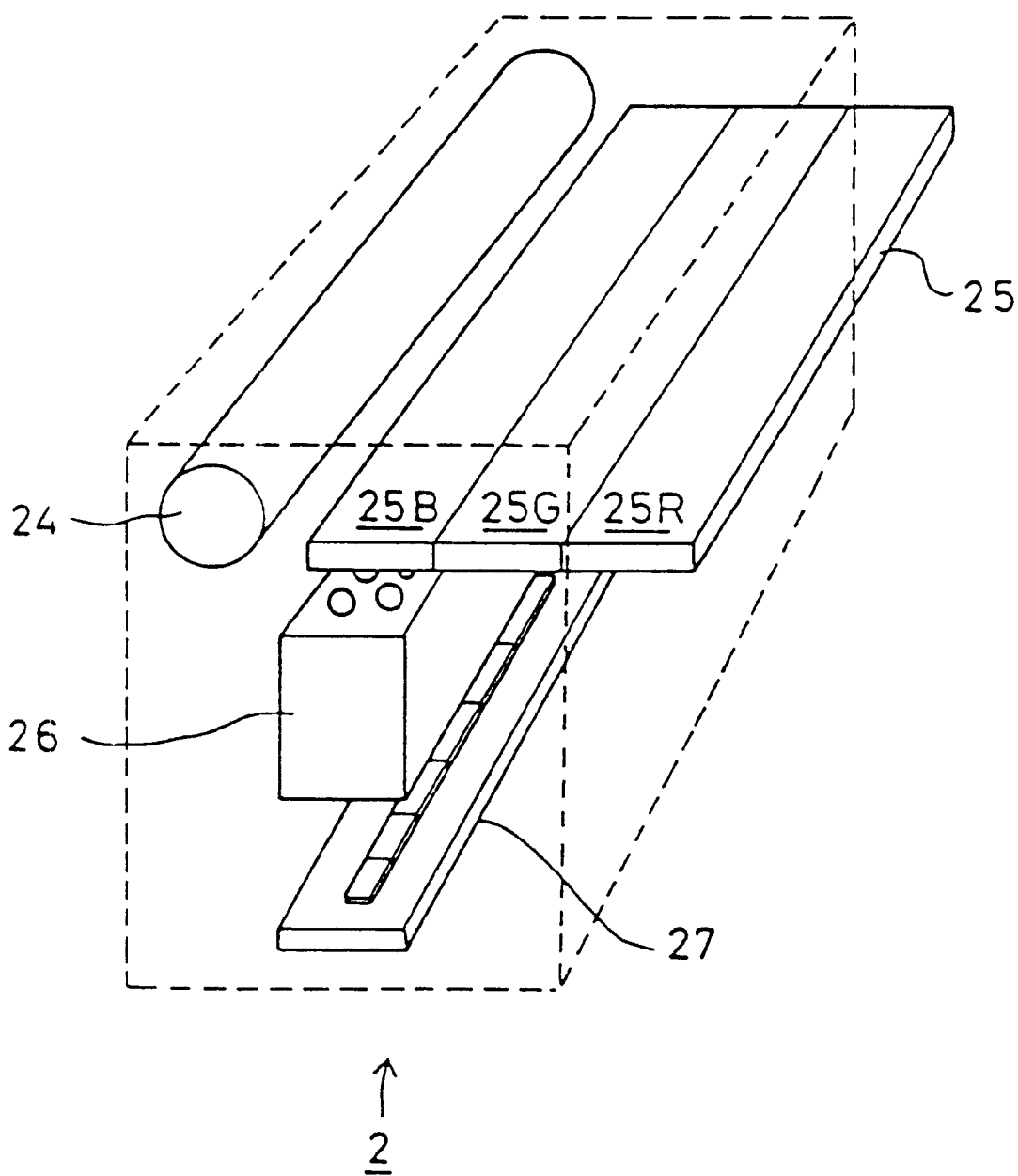
FIG. 2 is a schematic block diagram of a scanner unit as shown in FIG. 1.

FIG. 2 illustrates the scanner unit 2 according to a preferred embodiment of the present invention. The scanner unit 2 is comprised of a three color tube 24 for outputting light with wavelengths corresponding to blue (B), green (G) and red (R), a filter 25 having three kinds of filter elements 25B, 25G and 25R, each of which allows only the corresponding primary color to pass therethrough, a SELFOC lens 26, and a line type reading portion 27. In order to perform a color separation to obtain a separate image for the color blue of the original image, the original image is scanned with the scanner unit 2 by adjusting the blue filter element 25B of the filter 25 to the SELFOC lens 26. Similar operations are performed in regard to the colors green and red, respectively. Therefore, a sheet of the original image is scanned a total of three times. By way of example, a mechanism for selecting one of the filter elements 25B, 25G and 25R, can be adapted to move the filter 25 according to the scanning operations of the scanner unit 2. Also, a device for performing a color separation by selectively driving three optical sources independently of one another, may be employed as the scanner unit.

Next, an operation of processing the read image data, is described hereinbelow. The scanner unit 2 reads an original pixel image line by line. Namely, when an original is placed on the draft glass plate 1 and a reading of the original commences, the filter element 25B of the filter 25 is first selected. Thereafter, the scanner unit 2 performs a reading operation of the original pixel image line by line by means of the scanner driver 6. The obtained analog pixel data are converted into digital data by the A/D converter 7. The digital data are then transferred to the tone data expanding portion 8, which is comprised of a gate array. The data transferred to the tone data expanding portion 8 are transferred in the form of printing data to be printed by the line type thermal head and are stored in a predetermined storage area of the RAM 9.

FIGS. 3(a) to 3(d) illustrate a data conversion process. Analog data 28 (FIG. 3(a)) consisting of n pixels (n being a positive integer) is read by the scanner unit 2 and converted by the A/D converter 7 into n weighted digital data 29 (FIG. 3(b)). After the conversion, the digital data 29 are transferred to the tone data expanding portion 8, whereupon the digital data 29 are converted into vertically expanded data 30 which are in turn transferred to the line type thermal head 14. Thereafter, the data 30 are stored in the RAM 9 (FIG. 3(c)). The conversions of the digital data of the n pixels to the tone data are performed simultaneously. Further, the tone data are expanded in the vertical direction from an address x to an upper order address (x+y) according to the values of the weighted data. This expansion operation is similarly performed on the weighted digital data. Thus, the vertically expanded data for one pixel line are obtained as illustrated in FIG. 3(d).

The data for one pixel line of a color image are expanded in the RAM 9 in the form of the vertical data which can be printed by the line type thermal head 14. The vertically expanded data at the addresses from x to (x+y-1) correspond to a first tone level of one line of pixels. Further, data at the addresses from (x+y) to (x+2y-1) are the data of the same line of pixels corresponding to a second tone level. Similarly, data for the same pixel line corresponding to the other tone levels up to an m-th tone level are expanded therein. Incidentally, the difference between the first address of the data corresponding to each tone level and the last address of the data corresponding to the preceding tone level can be arbitrarily established. The vertically expanded data for a line of color pixels, which can be printed by the line type thermal head, are transferred to the printer controller 11 and are then supplied to the thermal head 14 when needed.

Figure 4:
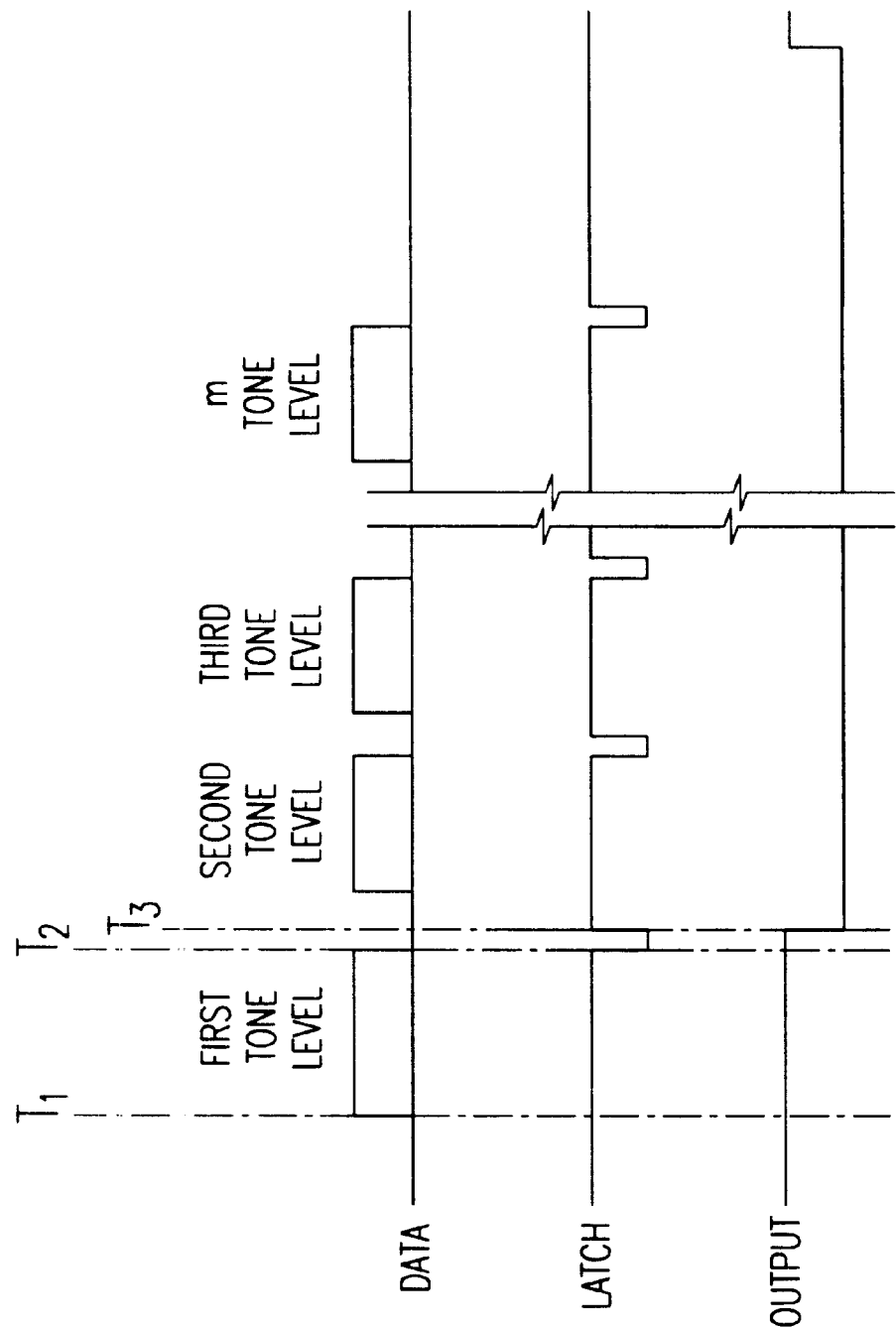
FIG. 4 is a timing chart illustrating an image printing operation of a thermal head of the copying machine of FIG. 1.

An operation for printing data representing a color pixel line is described hereinbelow. FIG. 4 is a timing chart for illustrating an operation of transferring the vertically expanded data from the printer controller 11 to the thermal head 14. First, at T1, the data corresponding to a first tone level are transferred to a shift register 14B of the line type thermal head in response to a clock signal. Upon completion of this transfer at T2, a latch signal is generated from the printer controller 11. In response to the latch signal, the data corresponding to the first tone level are output to a head driver 14A. A head driver driving signal is then supplied from the printer controller 11 to the head driver 14A at T3. The head driver 14A causes electric current to flow through each heating element of the thermal head 14 according to each data signal representing the first tone level data.

When the head 14 is driven according to the first tone level data, the second tone level data are transferred to the shift register 14B of the head 14. After the energy required to print an image represented by the first tone level data is supplied to the head, a latch signal is generated. Then, the second tone level data are transferred to the head driver 14A, and an image represented by the second tone level data is printed by the thermal head 14. Similarly, each tone level data are output and an image represented by the data consisting of one color pixel line is printed.

Figure 5:
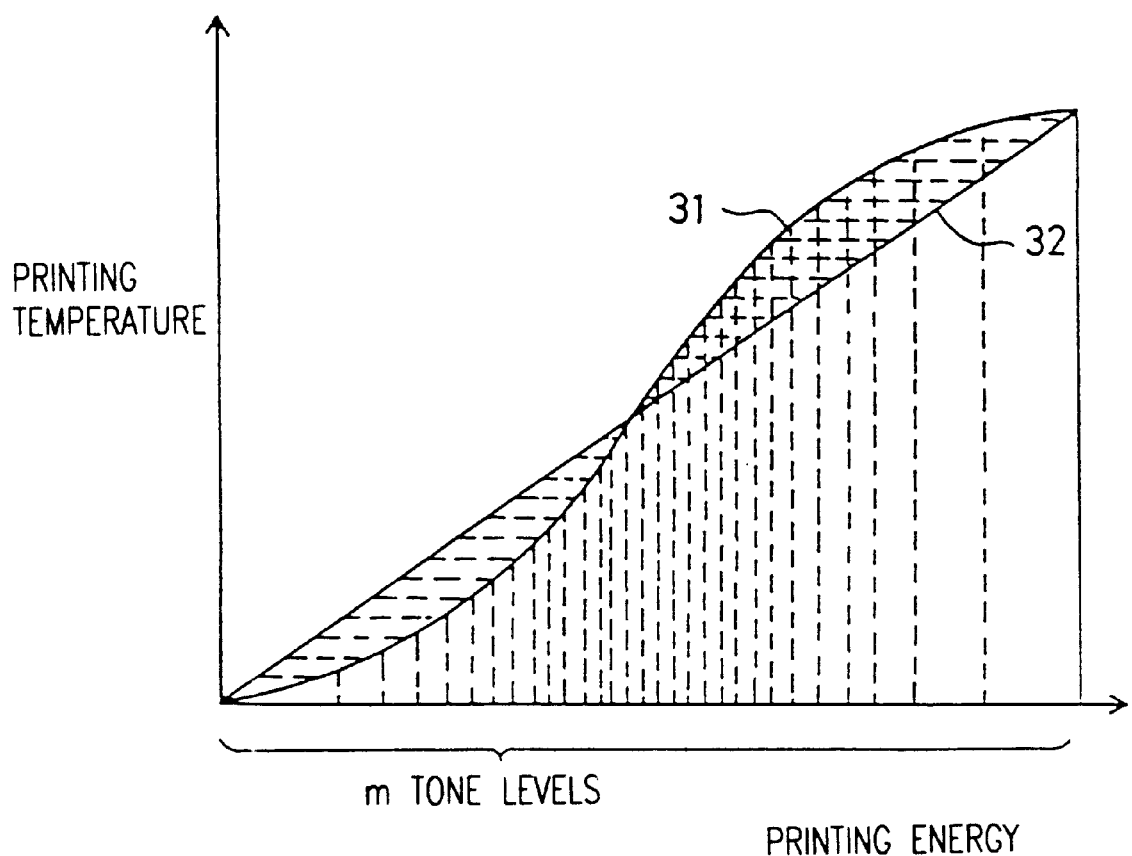
FIG. 5 is a diagram illustrating an image-printing-density characteristic curve of a sublimation type ink ribbon according to an embodiment of the present invention.

A characteristic curve of a sublimation type ink ribbon 15 used in the preferred embodiment is shown in FIG. 5. The curve represents the relationship between the printing energy and the printing density of a sublimation type ink ribbon. In this figure, reference numeral 31 designates the characteristic curve of the sublimation type ink ribbon, and 32 represents an equally divided auxiliary line for obtaining the printing densities corresponding to m tone levels. The printing energy required to reproduce each tone level by means of the sublimation type ink ribbon is obtained by vertically dividing the characteristic curve of the sublimation type ink ribbon 31 at equal intervals at the respective printing densities corresponding to the m tone levels and finding the horizontal coordinate of the intersection point between the curve and each line which is parallel to the horizontal axis and correspond to such printing densities. The output time of the thermal head of this embodiment is a period of time in which the energy required to reproduce each tone level can be supplied.

Figure 6:
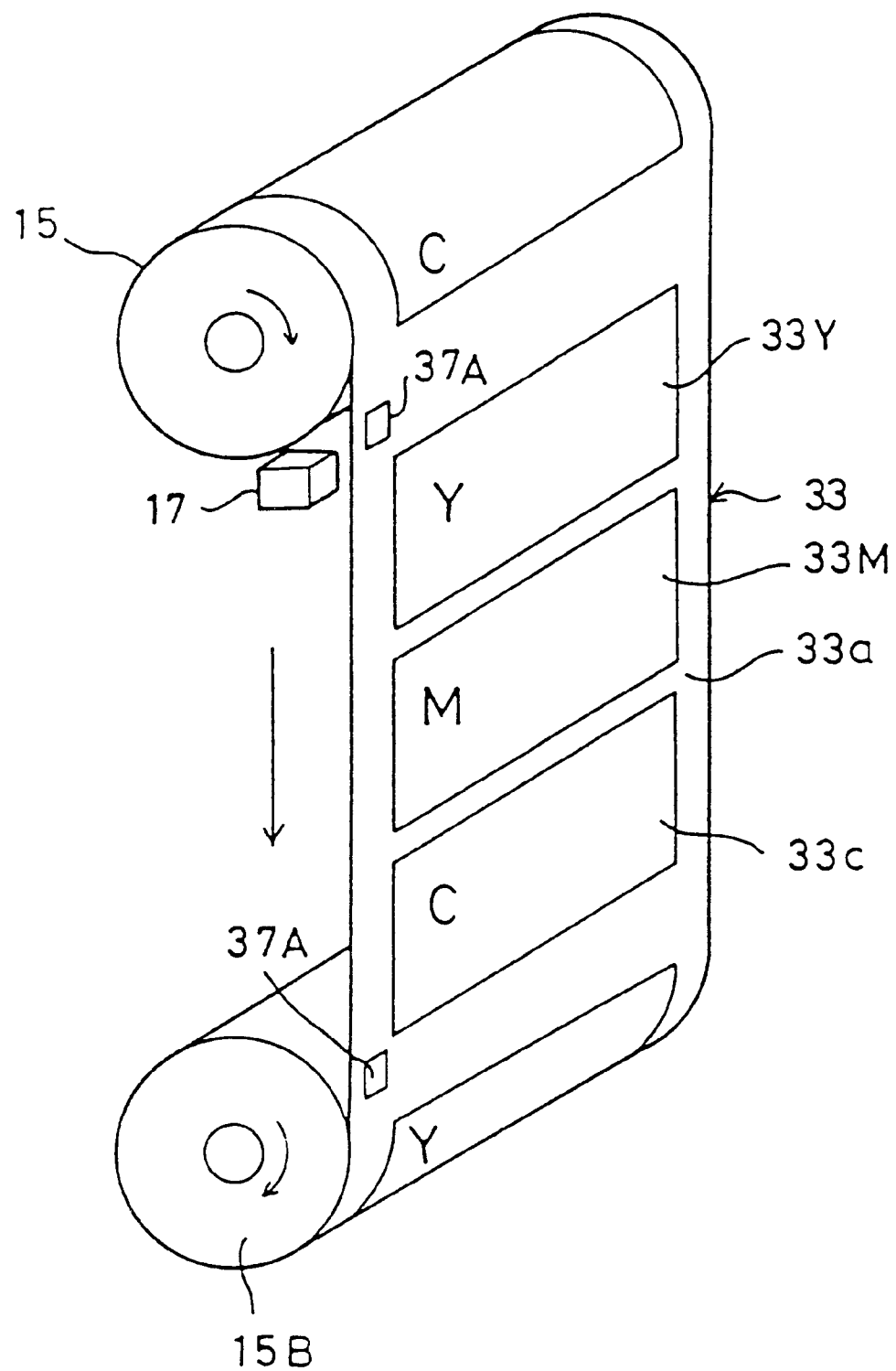
FIG. 6 is a diagram illustrating a configuration of an ink ribbon.

FIG. 6 illustrates the sublimation type ink ribbon used in the preferred embodiment. The sublimation type ink ribbon of this embodiment is adapted for an ink ribbon take-up roll 15B and a ribbon roll 15 through a predetermined ink ribbon conveying path. As illustrated in FIG. 1, the ink ribbon conveying path passes through the printing point between the thermal head 14 and the platen roll 10. Further, the ink ribbon moves along and is disposed on the printing face of the tape 16 (to be described later) through the printing point.

The ink ribbon 33 contains a film mount 33a further containing a yellow ink ribbon area 33Y, a magenta ink ribbon area 33M, and a cyan ink ribbon area 33C, positioned at regular intervals on the film mount 33a. A set of these three color ink ribbon areas is repeatedly printed longitudinally on the film mount 33a. At the beginning of each set of the ink ribbon areas, a marking 37A for detecting the position is placed. A photo sensor 17 for detecting the marking 37A is placed on an ink ribbon supplying path formed at the side of the body of the copying machine. In the preferred embodiment, the sublimation type ribbon is employed as the ink ribbon. Alternatively, a melting type ink ribbon may be employed as the ink ribbon.

When the printing of a first pixel line is finished, the motor driver 5 under the control of the CPU 19 drives the motor 4 for the scanner, whereby the pulley 3 rotates to shift the scanner unit 2 by one pixel line. At the same time, the CPU 19 sends a control signal to the motor driver 12 to drive the motor 13. Consequently, the platen roller 18 rotates to shift the sublimation type ink ribbon 33 and the tape 16 by one pixel line.

Thereafter, a second pixel line of the original image is read by the scanner unit 2 in a manner similar to the first pixel line of the original image data. Further, tone level data corresponding to the second pixel line are expanded by the tone data expanding portion 8 in the RAM 9. A storage area for storing the data for two pixel lines is reserved in the RAM 9. When the first pixel line is being printed, the reading of the image data of the second pixel line and the expanding of the read image data in the RAM 9 can be performed. To reduce processing time, it is preferable to perform the printing operation and the image reading operation simultaneously.

After reading the data of one color and printing the same data onto the tape 16, the scanner unit 2 returns to the initial position where the next filter element is selected. Concurrently, the line type thermal head 14 withdraws from the platen roller 18, so that the sublimation type ink ribbon 33 and the tape 16 having been inserted between the head and the roller are released therefrom. The tape 16 is rewound by the length of one scene by controlling the conveying mechanism and is then positioned at the initial print position. The ink ribbon 33 is positioned by means of the conveying mechanism in such a manner that the beginning of the next color ink ribbon area coincides with the initial print position. After the initialization, the color separation of each pixel line of the original image is performed to obtain a separate image for blue. Then, the read original image is printed over the surface of the tape 16 by using magenta ink. Upon completion of this printing operation, the color separation is performed to obtain a separate image for a third color, namely, red. The read original image is printed over the surface of the tape 16 by using cyan ink. This way, a color image corresponding to the read color image is reproduced or copied onto the surface of the tape.

Figure 7A:
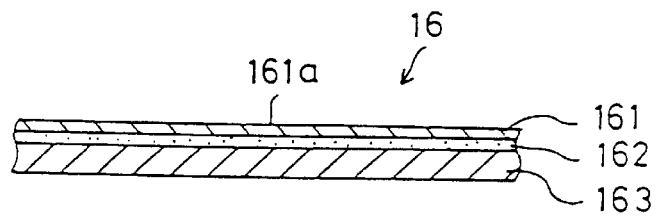
FIGS. 7(a) to 7(c) are a vertical sectional view, a plan view and a transverse sectional view of the ink ribbon as shown in FIG. 6.
Figure 7B:
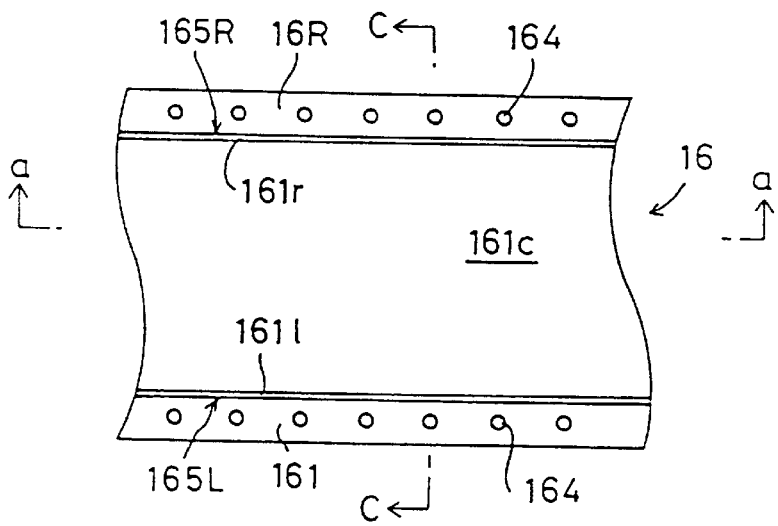
Figure 7C:
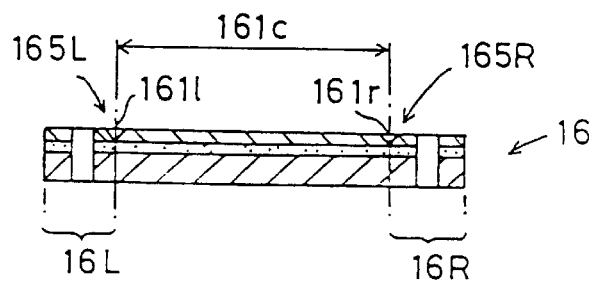

FIG. 7 illustrates the structure of the tape 16 used in the preferred embodiment. As described above, the tape 16 is composed of an image carrying sheet 161, the front surface of which is a printing face 161a for printing an image, an adhesive layer 162 formed by applying an adhesive to the back surface of this image carrying sheet and a release sheet 163 releasably affixed to the surface of the adhesive layer. After the image carrying sheet 161a is printed, the tape 16 is cut to a predetermined length. Further, the cut position of the tape can be affixed to any desired surface by peeling the release sheet from the back surface thereof. In the preferred embodiment shown in FIG. 1, a manual cutter 62 is provided at the tape exhaust port 61 of the copying machine for cutting the tape. Alternatively, where such cutting means is not provided, the tape may be cut to a desired length with a pair of scissors.

The tape 16 used in the embodiment has two conveyance border portions 16R and 16L of uniform width illustrated in FIG. 7(b). These portions 16R and 16L have equally spaced circular through holes 164. Further, half cuts 165R and 165L are made along the inner edges of the border portions 16R and 16L from the front surface of the tape. Each of these half cuts 165R and 165L extends over the image carrying sheet 161 on the front side of the tape and over the adhesive layer formed on the back side. Therefore, perforated portions 161r and 161l in the image carrying sheet 161 are located between one of the conveyance border portions and the intervening portion 161C, and the other conveyance portions and the intervening portion 161C, respectively. Further, the perforated portions 161r and 161l are separated from each other. In the preferred embodiment, the surface of this intervening portion 161C is an image carrying surface or a printing surface. The intervening portion 161C can be easily peeled from the release sheet 163 after the original image is copied on to it.

Figure 8A:
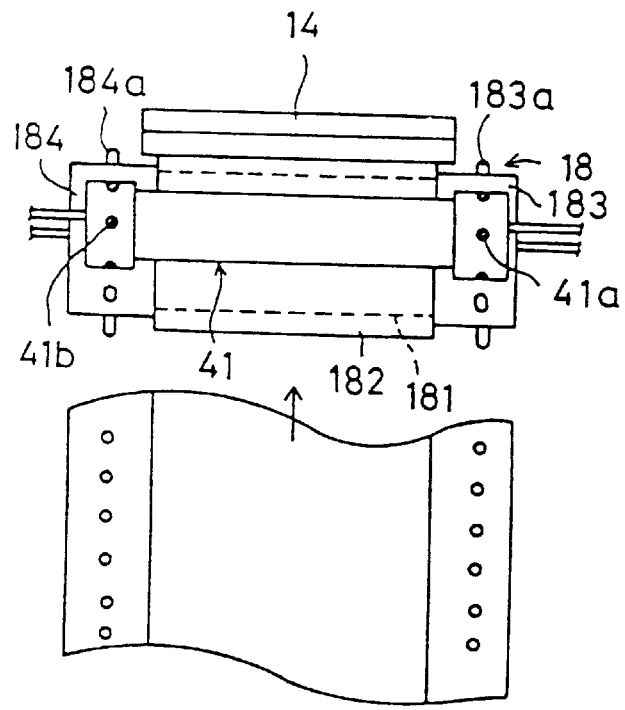
FIGS. 8(a) and 8(b) are a schematic plan view and a schematic side view of a sprocket type tape conveying mechanism according to an embodiment of the present invention.
Figure 8B:
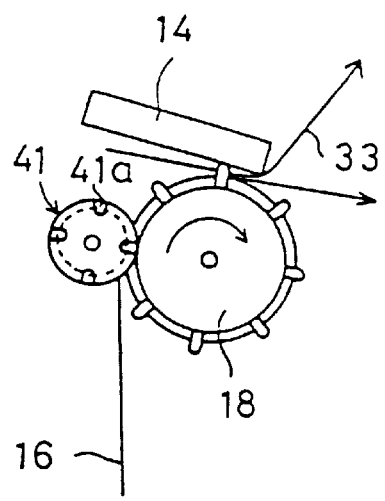

FIG. 8 shows a primary part of the conveying mechanism for conveying the tape 16. As shown in this figure, the platen roller 18 consists of a cylindrical body portion 181, a tube-like platen rubber 182 provided on the outer circumference of the cylindrical body portion 181, and sprockets 183 and 184 respectively formed at both ends thereof. Projections 183a and 184a, which have the same pitch as, and are formed on the outer circumferences of the sprockets 183 and 184, engage the through holes 164. A pressure roller 41 with a predetermined pressure is pushed against the platen roller 18. Recess portions 41a and 41b, with which the projections of the sprockets 183 and 184 are engaged, are formed with the same pitch on the outer circumferences of both ends of the pressure roller 41.

In the preferred embodiment, the tape 16 is conveyed by engaging the conveyance border portions 16R and 16L of the tape 16 between the projections 183a and 184a and the recess portion 41a and 41b of the pressure roller into which these projections are fitted. In this manner, the precise positioning of the tape 16 can be achieved and maintained. In the copying machine, a color image is reproduced or copied by overlapping separate images of three colors on the same printing area. To achieve this result, the tape 16 is preferably rewound to the initial printing position after an image is printed in one of three colors. This step is repeated for other colors. In the preferred embodiment, the feeding and rewinding of the tape 16 can be achieved with high precision by using the sprockets 183 and 184, thus eliminating the reproduction of a degraded image resulting from misalignment when the tape 16 is rewound multiple times.

Figure 9A:
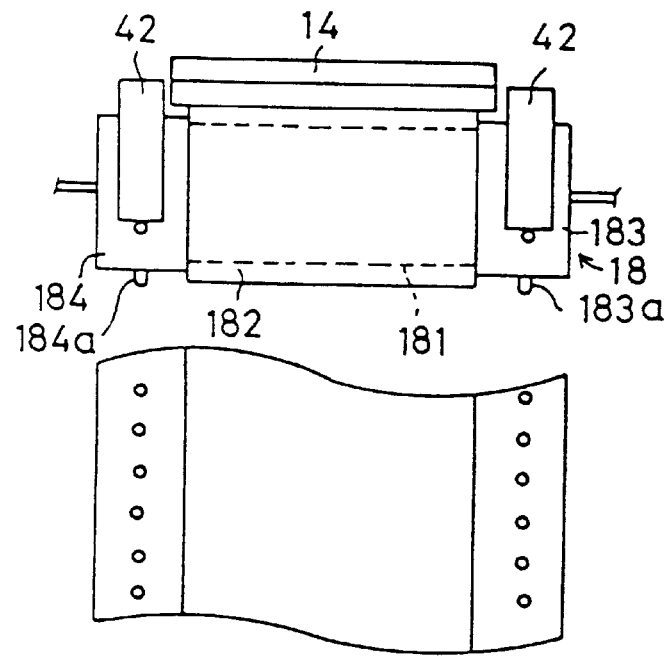
FIGS. 9(a) and 9(b) are a schematic plan view and a schematic side view of another embodiment of the sprocket type mechanism of FIG. 8.
Figure 9B:
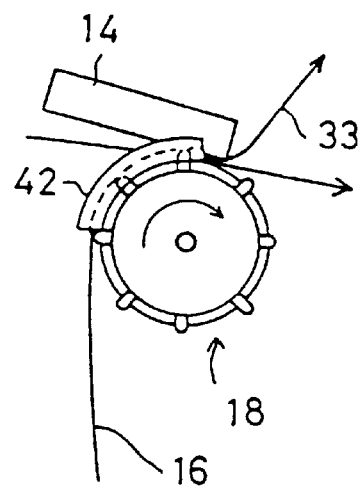

As illustrated in FIG. 9, a combination of the sprockets 183 and 184 and a pressure cover 42 may be employed instead of the combination of the sprockets 183 and 184 and the pressure roller 41.

Figure 10A:
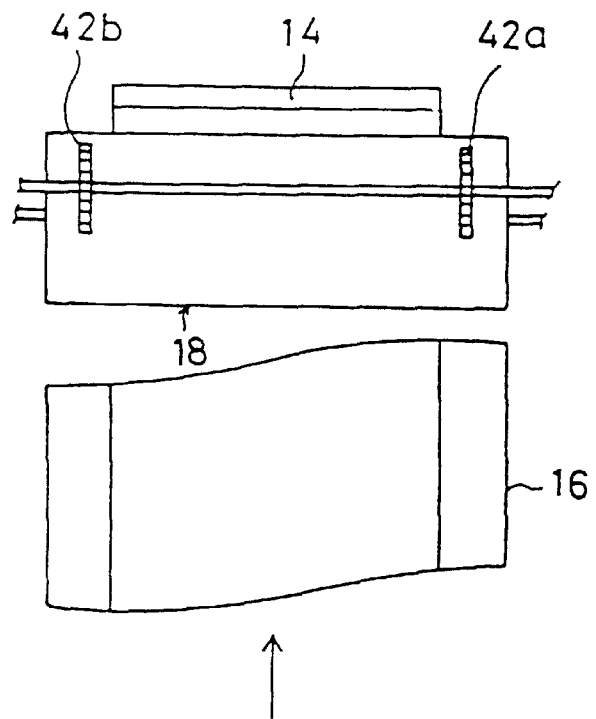
FIGS. 10(a) and 10(b) are a schematic plan view and a schematic side view of a "shuriken" type tape conveying mechanism.
Figure 10B:
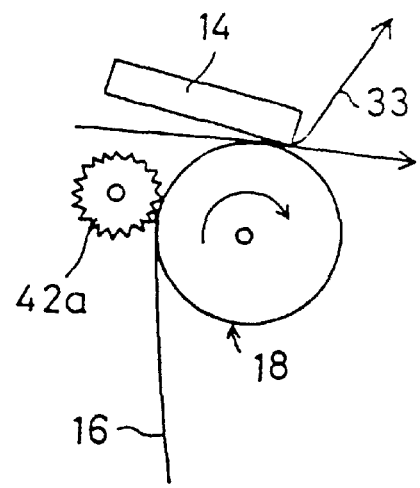
Figure 11A:
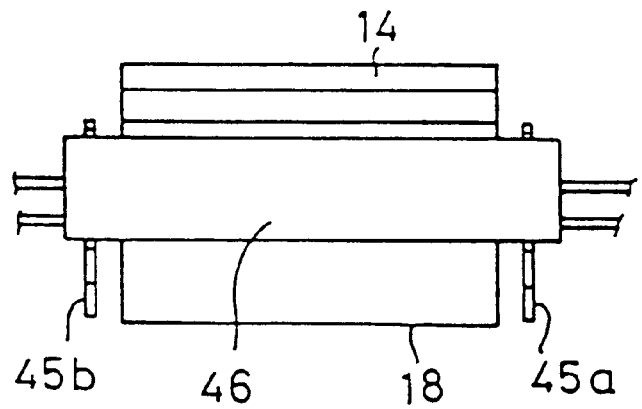
FIGS. 11(a) and 11(b) are a schematic plan view and a schematic side view of another embodiment of the shuriken type mechanism.
Figure 11B:
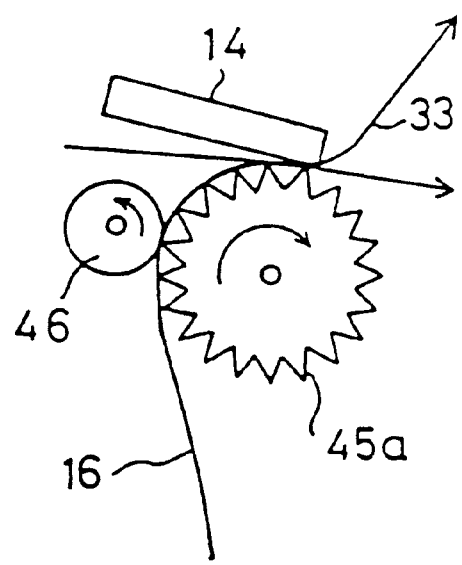

Alternatively, gears called "shuriken," as shown in FIG. 10, which have pointed teeth of a predetermined shape on the circumferences, or ratchet wheels, may be employed instead of the sprockets 183 and 184. In this embodiment, a pair of such gears or ratchet wheels 42a and 42b are mounted at both ends of the platen roll 18. The operations of feeding and rewinding the tape 16 can be performed without slippage and with high precision. When such gears are used, it is unnecessary to bore the through holes 164 in the conveyance border portions 16R and 16L. In contrast with the above embodiment, ratchet wheels 45a and 45b can be coaxially mounted at both ends of the platen roller 18 and abut against a pressure roller 46, as illustrated in FIG. 11.

Figure 12A:
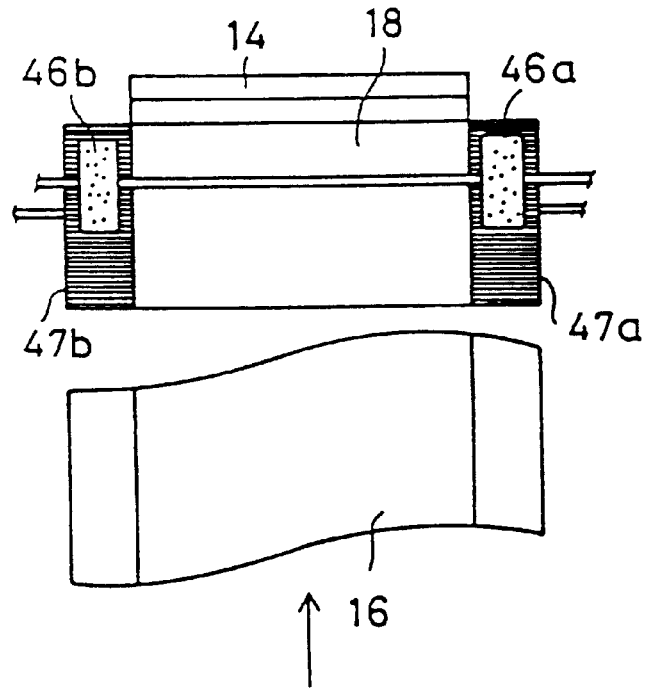
FIGS. 12(a) and 12(b) are a schematic plan view and a schematic side view of a file-stone type tape conveying mechanism.
Figure 12B:
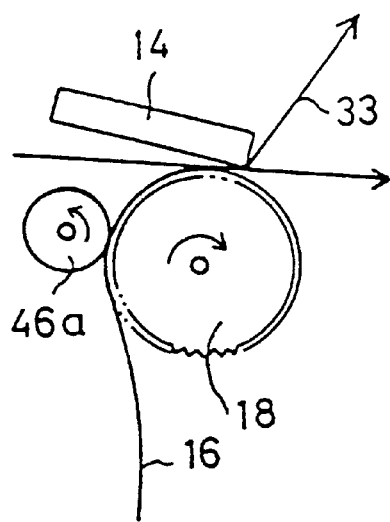

Still another conveyance mechanism for conveying the tape 16 is illustrated in FIG. 12. In this embodiment, fine spline teeth 47a and 47b are formed on the circumferences of both ends of the platen roller 18. Further, a pair of disc-like files 46a and 46b are provided in such a manner so as to face these teeth. The tape 16 is conveyed by putting the conveyance border portions 16R and 16L formed at both ends of the tape 16 therebetween. In this configuration, the tape 16 can be conveyed accurately and without slippage.

In the preferred embodiment, the tape 16 may be constructed into a tape roll 16a and placed in a tape cartridge. A fitting portion, to which the tape cartridge is fitted, is formed in the body case of the copying machine. The tape cartridge can be detachably fitted to this fitting portion. In this configuration, a new cartridge or a cartridge having a different width or color tape can be conveniently fitted.

Figure 13:
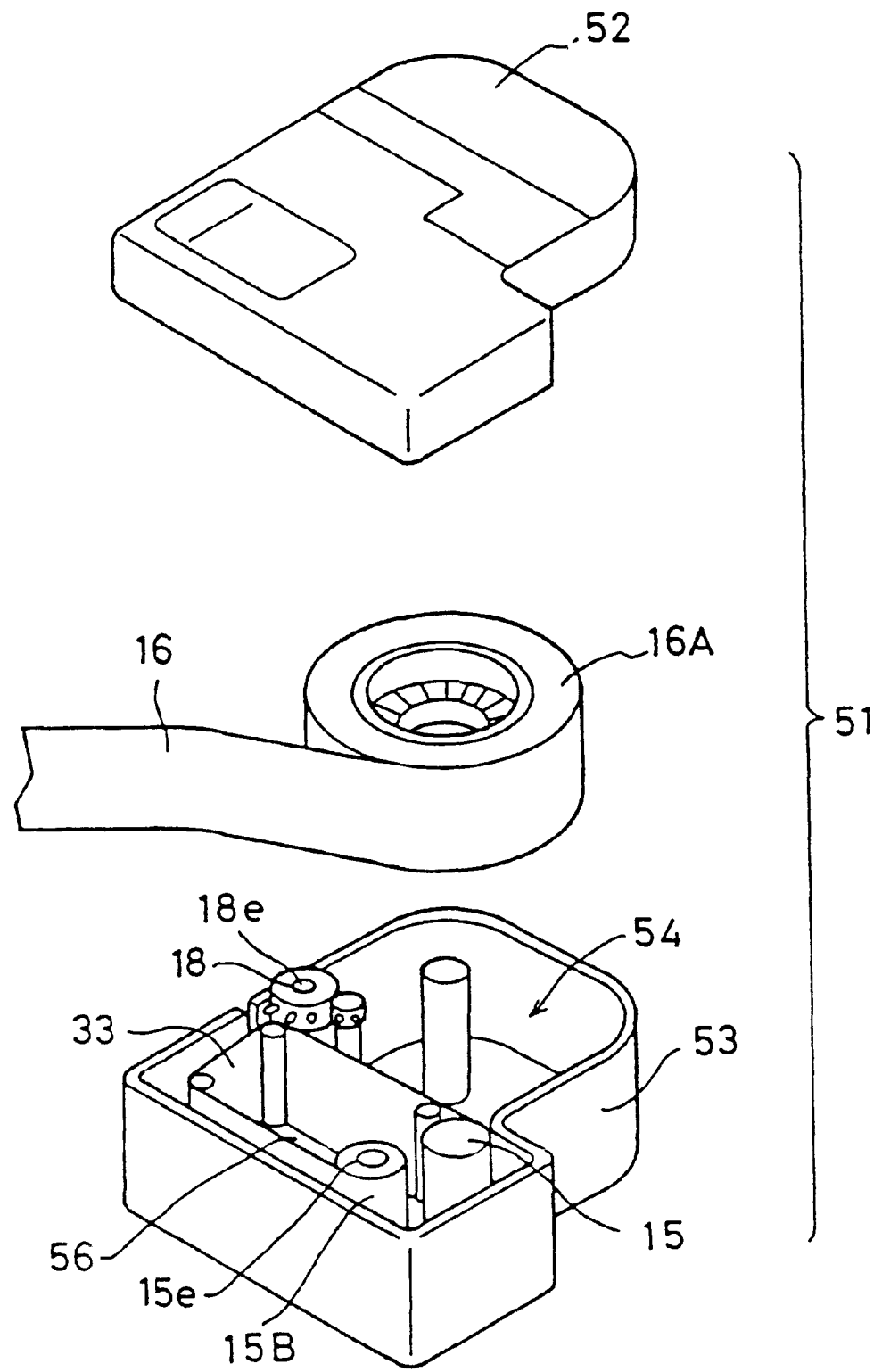
FIG. 13 is an exploded perspective diagram of a tape cartridge.
Figure 14:
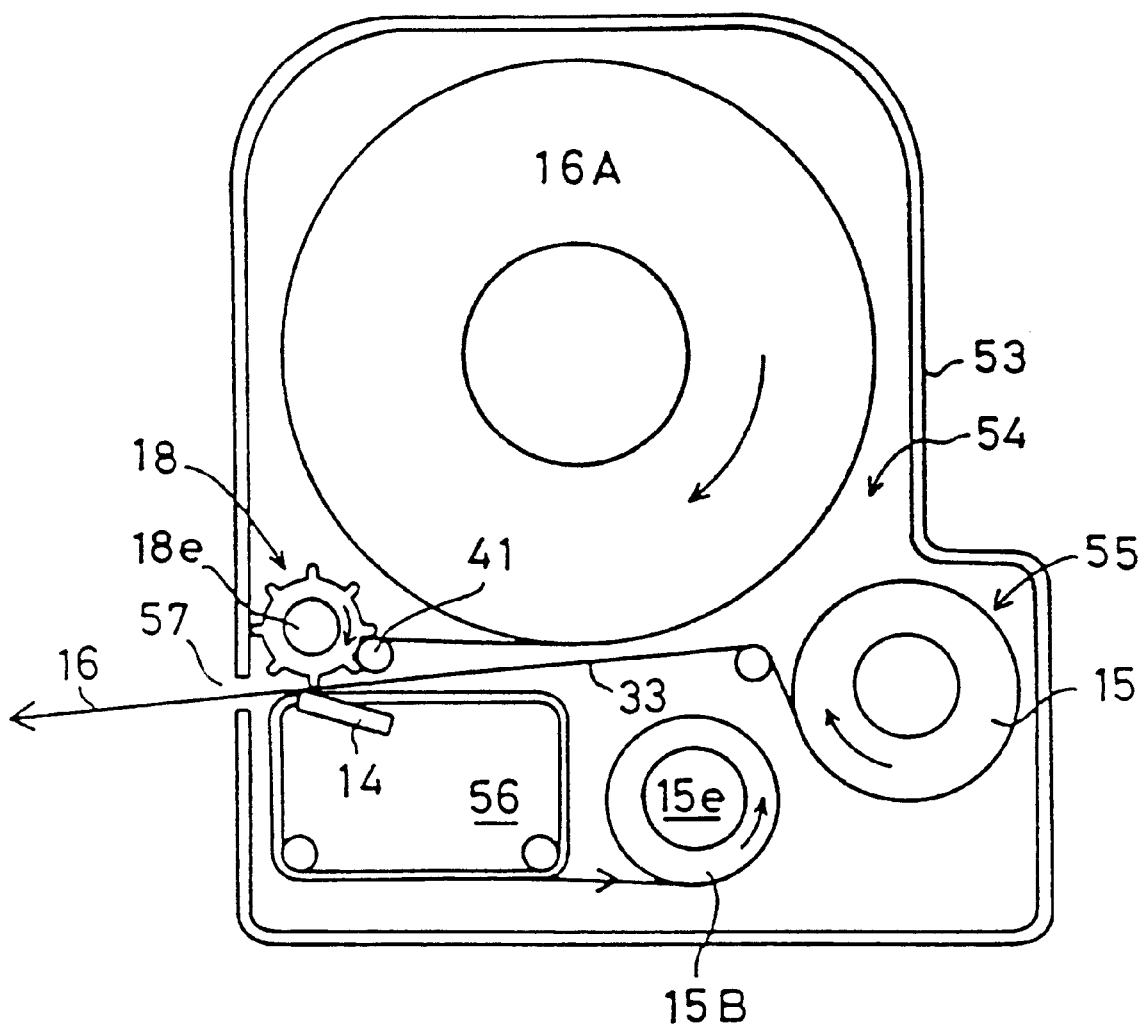
FIG. 14 is a schematic diagram of the tape cartridge.

In FIGS. 13 and 14, a tape cartridge 51 of the preferred embodiment is illustrated schematically. In the tape cartridge 51 of this embodiment, a ribbon roll 15, which preferably comprises the sublimation type ink ribbon 33, is enclosed with the tape roll 16A. The tape cartridge 51 comprises the combination of an upper case piece 52 and a lower case piece 53. The lower case piece 53 comprises a tape roll storing portion 54, a ribbon roll storing portion 55 and a ribbon take-up roller 15B. Furthermore, the platen roller 18 and the pressure roller 41 are also provided therein. Further, a through hole 56 bored in the direction of the width of the case is formed in the vicinity of the platen roller 18. When the tape cartridge 51 is mounted in the copying machine, the line type thermal head 14 is dispersed in the through hole 56 to face the circumference of the platen roller 18. Further, a drive shaft (not shown) adapted to be inserted into the center hole 18e of the platen roller 15B and the center hole 15e of the ribbon take-up roller 15B is provided in the fitting portion of the body of the copying machine to rotate and drive these rollers.

As shown in FIG. 14, the tape 16 fed from the tape roll 16A is placed between the platen roller 18 and the pressure roller 41. The tape 16 then passes between the platen roller 18 and the thermal head 14 where the printing occurs, and is taken out of the tape cartridge 51 through a tape exhaust port 57 formed on the outer circumferential wall of the case. The ink ribbon fed from the ribbon roll 15 is guided by a group of guide rollers and then passes the thermal head 14 before being finally retrieved by the ribbon take-up roller 15B. Incidentally, the platen roller and other suitable components may be provided in the body of the copying machine.

In the preferred embodiment, a pair of sprockets 183 and 184 are provided to accurately feed the tape 16. Thus, the width of the conveyable tape 16 is limited to the width of these sprockets. Therefore, the tape 16 having a width narrower than the width of the sprocket can not be fed. For example, in a case where an original image has a width narrower than the width of the tape 16, a large space is left in the direction of the tape width which makes it very uneconomical. This becomes more pronounced in a case where multiple copies are made onto the tape 16. To eliminate the waste caused by these situations, the shift register 14B in the line type thermal head 14, which is capable of storing image data of one pixel line of a reproduced image, is used so that a plurality of copies can be made in the direction of the tape width.

Figure 15A:
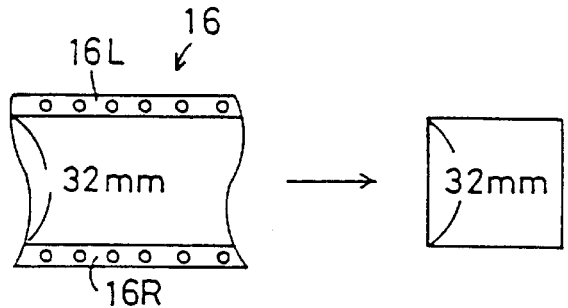
FIGS. 15(a) to 15(e) illustrate a case where two copies of an image are made onto the tape in the direction of the width thereof.
Figure 15B:
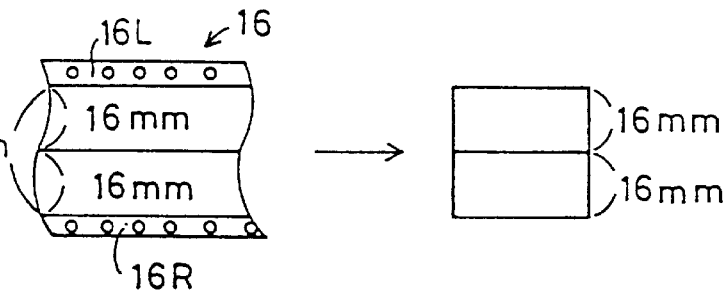

Assuming that the tape width (printing area) used in the preferred embodiment is 32 mm, as shown in FIGS. 15(a) and 15(b), the shift register 14B of the head driver 14A preferably has a temporary storage capacity sufficient to store one pixel line of the original image having the width of 32 mm. The shift register 14B is equally divided into a front-end shift register 141 and a back-end shift register 142 in the direction of supplying image data, and a clock signal is coupled to both registers. These two shift registers 141 and 142 are connected either in series or in parallel in the direction of the data flow, and the clock is provided to the registers through a selector circuit 143.

Figure 15C:
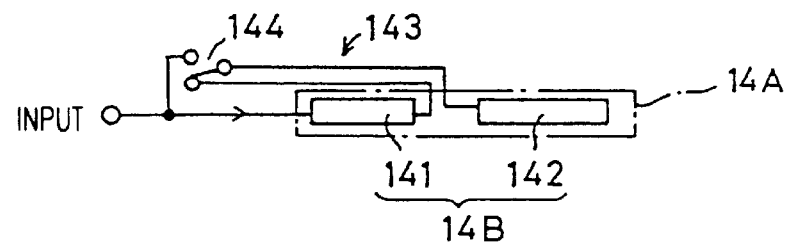

In a normal copying mode, the switch 144 of the selector 143 is set in a state as illustrated in FIG. 15(c) in such a manner to connect the front-end shift register 141 in series with the back-end shift register 142. In this state, the supplied data serially flow from the front-end shift register 141 to the back-end shift register 142. Upon completion of supplying one pixel line of data to both shift registers 141 and 142, a latch signal is provided. Then, the thermal head 14 is driven according to such data to print one pixel line.

Figure 15D:
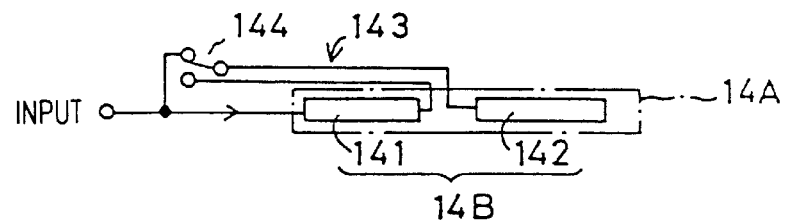
Figure 15E:
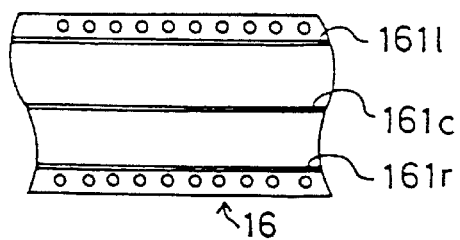

Conversely, when the state of the switch 144 of the selector circuit 143 changes to a state as illustrated in FIG. 15(d), the front-end shift register 141 and the back-end shift register 142 are connected in parallel with respect to each other. When image data are supplied to the circuit, the same image data are simultaneously provided to the front-end shift register 141 and the back-end shift register 142. In this case, image data of one line having the width of 16 mm (32 mm/2) is supplied thereto. When a latch signal is provided, the thermal head 14 is driven to print two copies of the same image having the width of 16 mm on the printing area. This reduces the tape waste.

Incidentally, it is apparent that the shift register 14B may be divided into more than two registers so as to simultaneously make more than two copies of the same image onto the tape in the direction of the tape width. In such a case, it is preferable to form a perforated portion 161c in the printing area of the image carrying sheet 161 on the surface of the tape 16 so that the formed images are separable from each other. A separate tape cartridge containing a pre-perforated tape may be used.

In the foregoing embodiment, image data are vertically expanded and are converted into printing data in the tone data expanding portion 8. Alternatively, a dithering method may be employed to expand the read image data into a bit map by using a dither matrix.

In another embodiment of the present invention, it is possible to scan an original image comprising a photographic negative film and to reproduce a positive image. In this embodiment, an inverting circuit for converting negative data into positive data may be coupled to the tone data expanding portion of the preferred embodiment. After the negative image data are converted into digital data, the digital data are converted into positive digital data in the tone data expanding portion 8. Thereafter, the positive digital data are converted into vertically expanded data which can be transferred to the line type thermal head and temporarily stored in the RAM. The conversion of the negative digital data to the positive digital data is performed by inverting each bit of the negative data.

In addition to the color copying operation described above, the preferred embodiment of the present invention can be similarly applied to copying a monochromatic image. Additionally, other known mechanisms may be employed as the image reading means and the printing means.

As described above, in the present embodiment a medium having an image carrying sheet, the front surface of which is a printing face to be printed with an image, an adhesive layer formed by applying an adhesive to the back surface of this image carrying sheet and a release sheet releasably affixed to the surface of the adhesive layer is employed as a recording medium wherein a monochromatic or multi-color image is printed. Therefore, a label having a reproduced image can be easily obtained by peeling the release sheet from the back surface of the recording medium. Moreover, a negative photographic film can be utilized as an original.

In a case where the tape is used as a recording medium, the conveyance border portions of a uniform width are formed at both ends thereof. In addition, a mechanism being capable of securely catching or holding a pair of the border portions is employed as the tape conveying mechanism. For instance, a pair of sprockets are employed as the tape conveying mechanism. Further, through holes, in which the sprockets can be engaged, are formed along each of the conveyance border portions. In this configuration, the tape is accurately advanced without slippage.

Moreover, in the case where the conveyance border portions are formed at both ends of the tape, a perforated portion may be formed in the image carrying sheet along the inner edge of the conveyance border portions along the longitudinal direction of the image carrying sheet. This allows the image carrying sheet to be easily peeled from the tape after an image is copied.

In the preferred embodiment, a line scanner for reading an original image line by line is employed as image reading means. Also, a line type thermal printer for reproducing individual pixel lines is employed as printing means. Moreover, a tape, which is employed as a recording medium, is conveyed by a conveying mechanism, such as a pair of sprockets which engage the conveyance border portions. Using the sprockets arranged in regular intervals impose restrictions on the tape width. Therefore, the width of the printing area on the tape is limited to a predetermined width. If an image having a width smaller than the tape width is copied, unused portions are formed on the tape. However, in the preferred embodiment, a shift register which is equally divided into N shift registers (N is an integer equal to or greater than 2), in the direction of the image data flow, is used in conjunction with a drive clock signal. Further, a group of these N shift registers may be connected with one another in the direction of the image data flow so that the connection between or among the N shift registers can be selectively changed to either serial or parallel. If the group of the shift registers are connected in parallel with one another and the same image data are supplied thereto simultaneously, a plurality of copies of the same image can be printed onto the tape. Where a plurality of copies (N copies) of the same image are made, the tape may be perforated to contain (N−1) perforated portions between the perforated portions in the image carrying sheet so that each portion can be easily separated and peeled from the tape.

What is claimed is:

1. A copying machine comprising:
   a recording medium being in a form of a roll having an image carrying sheet with a printing face for printing an image, a release sheet releasably secured to a back surface of the image carrying sheet;
   an image reading scanner for reading an original image line by line and digitally transforming the original image into image data storable in a memory, wherein the image data includes tone data;
   an image printing device having a printing head for printing the image data based on the tone data on the recording medium by the printing head;
   a recording medium conveying mechanism; and
   a cartridge for mounting the recording medium and the recording medium conveying mechanism;
   the recording medium conveying mechanism conveying the recording medium to the image printing device, wherein the recording medium conveying mechanism has a cartridge fitting portion adapted for removably mounting the cartridge to the copying machine.

2. A copying machine according to claim 1, wherein the printed recording medium by the image printing device is cut by a cutting mechanism.

3. A copying machine comprising:
   a recording medium being in a form of a roll disposed in the copying machine;
   an image reading device for reading an image and digitally transforming the image into image data storable in a memory, wherein the image data includes tone data;
   a recording medium conveying mechanism;
   a cartridge for mounting the recording medium and the recording medium conveying mechanism; and
   an image printing device coupled to the image reading device and the memory for producing the image data based on the tone data on the recording medium, wherein the image printing device comprises a print device for reproducing each pixel of the image data, wherein the printing device comprises a print head and at least one shift register for storing the image data for reproduction by the print head;
   the recording medium conveying mechanism conveying the recording medium to the image printing device, wherein the recording medium conveying mechanism has a cartridge fitting portion adapted for removably mounting the cartridge to the copying machine.

4. A copying machine according to claim 3, wherein the shift register is coupled in one of serial and parallel configurations for producing the image data on the recording medium.

5. A copying machine according to claim 3, wherein the image reading device is a line scanner operable to read each pixel of the image line by line.

6. A copying machine according to claim 3, wherein the print device is a line type thermal printer.

7. A copying machine according to claim 3, wherein the recording medium comprises a tape having a uniform width.

8. A copying machine according to claim 3, further comprising an image data conversion device coupled to the image reading device for converting the image data of a negative film scanned by the image reading device to positive image data, wherein the image data of the negative film are produced on the recording medium as a positive image.

9. A copying machine according to claim 3, wherein the image reading device includes a scanner comprising at least one camera for reading a color image, and the image printing device is a color printer for reproducing the color image.

10. A method for reproducing an image using a copying machine, the method comprising the steps of:
    providing a recording medium conveying mechanism;
    placing a recording medium into a cartridge which mounts the recording medium and the recording medium conveying mechanism so that the recording medium conveying mechanism conveys the recording medium to an image printing device, and with the recording medium conveying mechanism having a cartridge fitting portion adapted for removably mounting the cartridge to the copying machine;
    disposing the cartridge with the recording medium being placed in the copying machine;
    reading the image with an image reading device and digitally transforming the image into image data storable in a memory, wherein the image data includes tone data; and
    producing the image data based on the tone data on the recording medium with an image printing device coupled to the image reading device and the memory, wherein the image printing device comprises a print device for reproducing each pixel line of the image data, where in the print device comprises a print head and at least one shift register for storing the image data for reproduction by the print head.

* * * * *